United States Patent [19]

Suzuki

[11] 4,259,392
[45] Mar. 31, 1981

[54] MULTILAYER MAGNETIC RECORDING MEDIUM

[75] Inventor: Masaaki Suzuki, Odawara, Japan

[73] Assignee: Fuji Photo Film Co., Ltd., Minami-ashigara, Japan

[21] Appl. No.: 916,430

[22] Filed: Jun. 16, 1978

[30] Foreign Application Priority Data

Jun. 16, 1977 [JP] Japan .................................. 52/70508

[51] Int. Cl.² ............................................ H01F 10/02
[52] U.S. Cl. .................................... 428/212; 360/134;
360/135; 360/136; 427/131; 428/212; 428/336;
428/339; 428/693; 428/900; 428/694
[58] Field of Search ............... 428/539, 336, 900, 339,
428/329, 212; 360/134, 135, 136; 427/131, 128

[56] References Cited

U.S. PATENT DOCUMENTS

| | | | |
|---|---|---|---|
| 3,740,266 | 6/1973 | Akashi et al. | 428/215 |
| 4,075,384 | 2/1978 | Suzuki et al. | 428/900 |

FOREIGN PATENT DOCUMENTS

| | | | |
|---|---|---|---|
| 1909155 | 7/1973 | Fed. Rep. of Germany | 428/900 |
| 2507975 | 9/1975 | Fed. Rep. of Germany | 427/131 |
| 2615961 | 10/1976 | Fed. Rep. of Germany | 427/131 |

*Primary Examiner*—Stanley S. Silverman
*Attorney, Agent, or Firm*—Sughrue, Rothwell, Mion, Zinn and Macpeak

[57] ABSTRACT

A magnetic recording tape comprising a non-magnetic support having thereon a dual layer magnetic recording coating comprising ferromagnetic particles dispersed in a binder, wherein the fine ferromagnetic particles of the outer layer are a mixture of two or more kinds of fine ferromagnetic particles having two or more peaks in the coercive force distribution and said particles containing at least one kind of fine ferromagnetic alloy particles and the fine ferromagnetic particles of the inner layer being ferromagnetic iron oxide particles having peaks in the coercive force distribution lower than the minimum peaks in the coercive force distribution of the ferromagnetic particles of the outer layer, with the thickness of the outer layer not being greater than the thickness of the inner layer.

12 Claims, 10 Drawing Figures

MULTILAYER MAGNETIC RECORDING MEDIUM

BACKGROUND OF THE INVENTION

1. Field of the Invention

This invention relates to a multilayer magnetic recording medium and, in particular, to a dual layer magnetic recording tape having improved magnetic recording properties.

2. Description of the Prior Art

Recently, with the requirements of quality improvement and high density of magnetic recording tapes in both open reel tapes and cassette tapes, multilayer type magnetic recording tapes, that is, magnetic recording tapes having two or more magnetic recording layers, have been developed.

Multilayer magnetic recording tapes are described in, for example, Japanese Patent Publication Nos. 2218/'62 and 23,678/'64; Japanese Patent Application (OPI) Nos. 31,602/'72 (the term "OPI" as used herein refers to a "published unexamined Japanese patent application") (or U.S. Pat. No. 3,761,311); 31,804/'72; 31,907/'73 (or U.S. Pat. No. 3,775,170); and 31,804/'75; U.S. Pat. Nos. 2,643,130; 2,647,954; 2,041,901 and 3,676,217; and West German Patents (DT-AS) Nos. 1,190,905 and 1,238,072.

In this case, an important problem is the setting of the operating bias and equalization and the setting value is usually very near a generally designated standard bias. Therefore, magnetic recording tapes operable at this value are readily and most generally used and thus are very advantageous since such magnetic recording tapes do not require any specific bias setting and equalization.

As the easiest means for increasing the magnetic recording density, increasing the coercive force of the ferromagnetic iron oxide used for the magnetic recording tapes has been proposed. However, such magnetic recording tapes are not generally compatible with the above-described standard bias in using these tapes and in order to obtain optimum characteristics for magnetic recording tapes, a different operating bias and equalization setting for the magnetic recording tapes must be used. That is, a standard bias, a chromium dioxide bias, a multilayer magnetic tape bias, etc. are used.

Conventional dual layer magnetic recording tapes may be superior in the output in the low frequency region but they require a specific position in operating bias and equalization.

This is, for example, as shown in Table 1 below.

TABLE 1

| Type of Magnetic Recording Tape | Bias[1] (%) | Equalizer[2] ($\mu$sec.) |
| --- | --- | --- |
| Low-Noise Type | 100 | 120 |
| Fe-Cr Type[3] | 130 | 35–50 |
| CrO$_2$ Type | 160 | 70 |

[1]Low noise type magnetic recording tape is shown as standard (100%).
[2]The time constant ($\mu$sec.) of low noise type equalization is shown as a standard (120 $\mu$sec.). The time constant of a Fe-Cr type magnetic recording tape is usually 40–60% of the standard value and that of a CrO$_2$ type magnetic recording tape is usually 50–70% of the standard value.
[3]DUAD Ferri Chrome tape (registered trade name, made by SONY Corp.), Scotch CLASSIC Cassette tape (registered trade mark, made by 3M Co.), Ferrochrome tape (registered trade name, made by BASF A.G.), and CARAT tape (registered trade mark, made by AGFA-GEVAERT N.V.) are used as examples.

Accordingly, in order to use tape recorders, tape decks, etc., under the best conditions for a magnetic recording tape, the devices must be equipped with the bias and equalization positions as shown in Table 1 above.

Conventional low-noise type and CrO$_2$ type magnetic recording tapes which are known to have the best characteristics have, for example, the fundamental properties of Sample No. 1 and Sample No. 2 shown in Table 4 below. Furthermore, multilayer magnetic recording tapes developed for the purpose of further improving the characteristics of magnetic recording tapes, Sample No. 1 and Sample No. 2 have the fundamental properties of, for example, Sample No. 3 and Sample No. 4 as illustrated in Table 4 shown hereinafter.

In addition, the layer structure of a dual layer type magnetic recording tape is illustrated in FIG. 1 of the accompanying drawings as a schematic enlarged sectional view thereof, wherein an inner magnetic recording layer 2 and an outer magnetic recording layer 1 are formed on a non-magnetic support 3.

In Table 4, Sample No. 3 is the dual layer magnetic recording tape prepared according to the description of Japanese Patent Application (OPI) No. 51,908/'77 (corresponding to U.S. Pat. No. 4,075,384) and Sample No. 4 is also a dual layer magnetic recording tape prepared in a similar manner except that the coercive force of each magnetic recording layer thereof was 1.6 times higher than that of each corresponding magnetic recording layer of Sample No. 3. As will be understood from Table 4, a dual layer magnetic recording tape can be provided with excellent characteristics as compared with single layer type magnetic recording tapes.

Also, multilayer (dual layer) magnetic recording tapes prepared for the purpose of further improving the sensitivity in the high frequency range for the frequency characteristics (FIG. 2 and FIG. 3) of Sample No. 3 and Sample No. 4 have the fundamental characteristics of, for example, Sample No. 5 and Sample No. 6 shown in Table 4. As is shown in FIG. 2 and FIG. 3 of the accompanying drawings, both Sample No. 5 and Sample No. 6 have higher sensitivity in the high frequency range than those of Sample No. 3 and Sample No. 4 but the sensitivity in the range of 2 KHz–6 KHz is low, which results in unbalanced sound. Furthermore, on comparing Sample No. 3 with Sample No. 5 and Sample No. 4 with Sample No. 6, it will be understood that Sample No. 5 and Sample No. 6 have a higher harmonic distortion factor, a lower maximum output level (MOL), a lower S/N ratio (signal to noise ratio), and less dynamic range. Thus, when the difference in coercive force between the inner magnetic recording layer and the outer magnetic recording layer of a dual layer magnetic recording tape is increased, the frequency characteristics may be increased but the sound balance frequently becomes poor.

Moreover, in order to record and reproduce using a magnetic recording head without reducing the magnetic characteristics of the inner magnetic recording layer of a dual layer magnetic recording tape, the outer magnetic recording layer thereof preferably is thin and in order to obtain sufficient effects such as an improvement in sensitivity in the high freqeuncy range by a thin outer magnetic recording layer, it is desirable to increase the maximum residual magnetic flux density of the magnetic recording layer.

Therefore, in using fine particles of chromium dioxide having a comparatively high coercive force for the outer magnetic recording layer of a dual layer magnetic recording tape, there are the disadvantages that it is difficult to industrially produce chromium dioxide particles having a coercive force of higher than about 700 oe and when the coercive force thereof is increased, the maximum residual magnetic flux density is reduced. Also, the use of chromium dioxide particles for the outer magnetic recording layer is undesirable since the abrasion of the magnetic recording head is severe and the life of the magnetic recording head is reduced. Still further, since thermal demagnetization of a magnetic recording layer composed of chromium dioxide particles occurs to a great extent and the balance between the magnetic characteristics of the outer magnetic recording layer and the magnetic characteristics of the inner magnetic recording layer due to changes in temperature is lost, the use of chromium dioxide particles as a material for one magnetic recording layer of a multilayer magnetic recording material is not very desirable.

SUMMARY OF THE INVENTION

The present invention provides a magnetic recording medium capable of providing the best characteristics with an ordinary tape recorder or tape deck unaccompanied by the above-described disadvantages, having good linearity over broad frequency ranges and broad dynamic range, i.e., noise to maximum output range, and having good total balance and relates to a magnetic recording tape having two magnetic recording layers on a support.

A first object of this invention is to provide a dual layer magnetic recording medium having two magnetic recording layers and capable of providing the best characteristics of a magnetic tape at a conventional bias and/or equalization position such as, for example, a low noise position and a $CrO_2$ position without need of a new tape bias selection position.

A second object of this invention is to provide a dual layer magnetic recording medium with good linearity over broad frequency ranges and a broad dynamic range and showing good overall balance.

Use of a mixture of two kinds of ferromagnetic particles, each having a difference coercive force, for the outer magnetic recording layer for improving the various characteristics of Sample No. 5 and Sample No. 6 described above was investigated and as the result thereof, it has been found that these new samples have the fundamental characteristics of Sample No. 7 and Sample No. 8 shown in Table 5 hereinafter, that is, Sample No. 7 has higher frequency characteristics than Sample No. 3 and the difficulties in Sample No. 5 described above have been overcome in the sample.

That is, as the result of investigations on the manner of using a mixture of two or more kinds of ferromagnetic particles, each having a different coercive force, as materials for the outer magnetic recording layer of a dual layer magnetic recording medium, the present invention has been obtained.

Thus, according to this invention, there is provided a multilayer magnetic recording medium comprising a non-magnetic support having thereon two magnetic recording layers, each mainly composed of fine ferromagnetic particles dispersed in a binder, the fine ferromagnetic particles of the outer magnetic recording layer being a mixture of two or more kinds of fine ferromagnetic particles having two or more peaks in the coercive force distribution and the particles containing at least one kind of ferromagnetic alloy particles, the fine ferromagnetic particles of the inner magnetic recording layer being fine ferromagnetic iron oxide particles having peaks in the coercive force distribution lower than the miminum of the peaks in the coercive force distribution of the ferro-magnetic particles of the outer magnetic recording layer, and the thickness of the outer magnetic recording layer being not greater than the thickness of the inner magnetic recording layer.

DETAILED DESCRIPTION OF THE INVENTION

Figure 4A:
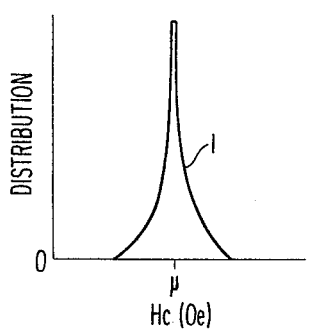
FIGS. 4(a), (b), (c), and (d) are graphs showing examples of coercive force distributions of ferromagnetic particles.
Figure 4B:
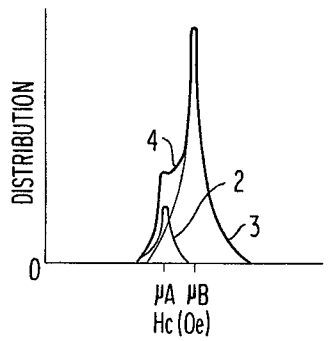
Figure 4C:
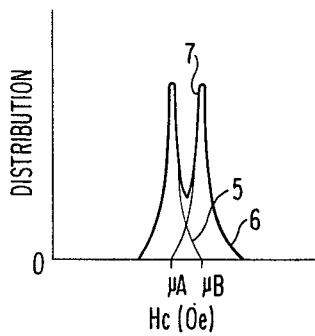
Figure 4D:
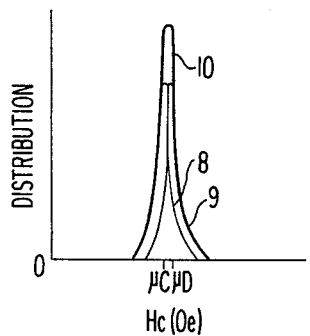

The coercive force distribution is, for example, shown by Curve 1 in FIG. 4 and the peak value ($\mu$) is shown by the value of $\mu$ as shown in FIG. 4(a). As shown in, for example, FIG. 4(b), when ferromagnetic particles A (Curve 2) are mixed with ferromagnetic particles B (Curve 3), the coercive force distribution shows only one clear peak value ($\mu B$) as shown by Curve 4. However, as shown in FIG. 4(c), when the mixing ratio of ferromagnetic particles A (Curve 5) and ferromagnetic particle B (Curve 6) is changed, the coercive force distribution clearly shows two peaks ($\mu A$ and $\mu B$) as shown by Curve 7 and hence it can be determined before kneading or coating the ferromagnetic particles whether the ferromagnetic particles are composed of the same kind of ferro-magnetic particles or different kinds of ferromagnetic particles. Furthermore, as shown in FIG. 4(d), when the composition of ferromagnetic particles C (Curve 8) is the same as that of ferromagnetic particles D (Curve 9) (for example, both are acicular gamma-$Fe_2O_3$ particles) and the $\mu$ values thereof are close to each other, only one peak appears when they are mixed together as shown in Curve 10. Hence it is difficult to distinguish ferromagnetic particles C from magnetic particles D of the mixture. Therefore, the coercive force distribution of a mixture of ferromagnetic particles having two or more peaks in the coercive force distribution used for the outer magnetic recording layer in this invention is the coercive force distribution as shown in FIG. 4(c).

Figure 5:
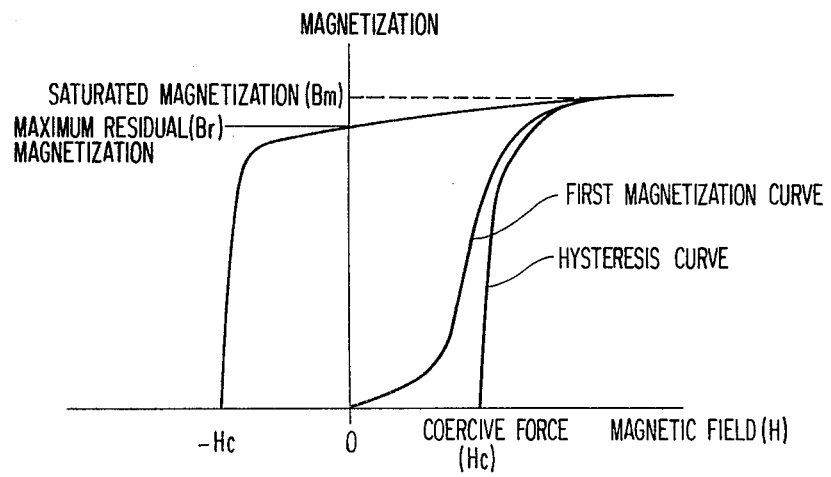
FIG. 5 is a graph showing B-H characteristics.

The results of the investigations leading to this invention will be described in greater detail. That is, when the B-H characteristics of single layer magnetic recording tapes are almost the same except that the H-axis of the magnetic field differs in proportion to the coercive force (as shown in FIG. 5), the operation bias value determined by the thickness of magnetic recording tape and the coercive force thereof has the value shown in FIG. 6. In this case, when the thickness of the magnetic recording tape is increased, the bias curve (as shown in FIG. 7) tends to become broader, the sensitivity tends to increase, the frequency charcteristics tend to decrease, the harmonic distortion factor tends to be reduced, and the maximum output level tends to increase. Also, when the coercive force increases, the operation bias value is increased, the sensitivity is reduced, and the frequency characteristics are increased. Therefore, for a low-noise type magnetic recording tape, a reproducing equalization (Table 1) in which the time constant at the high frequency side is reduced is generally used at the $CrO_2$ position. Therefore, on considering the balance of the various characteristics, single layer magnetic recording tapes are prepared as, for example, Sample No. 1 and Sample No. 2 (Table 4).

Figure 1:
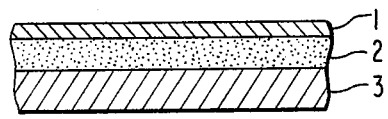
FIG. 1 is a schematic enlarged cross sectional view showing the layer structure of a multilayer magnetic recording tape.
Figure 2:
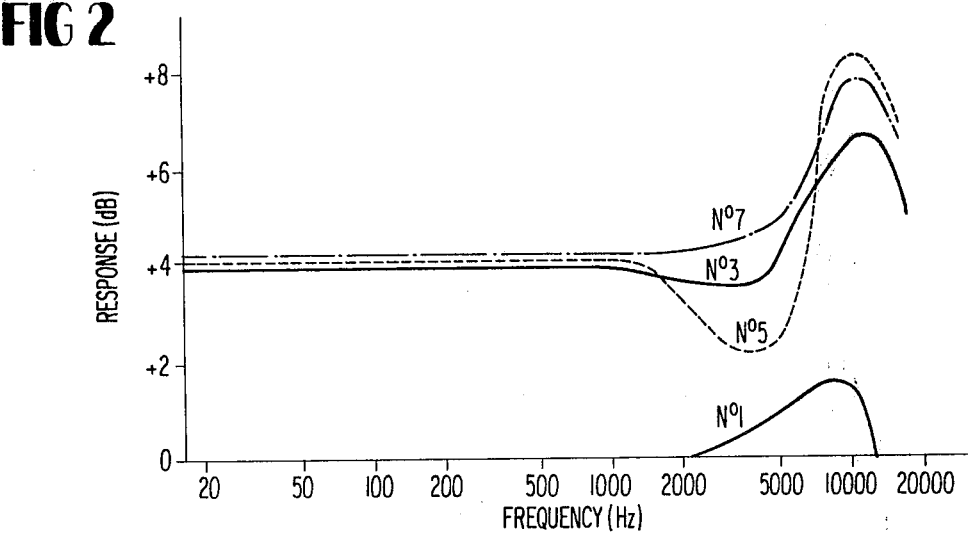
FIG. 2 is a graph showing the frequency characteristics of a low-noise type magnetic recording tape at 100% bias (a standard tape is assumed to be flat at 0 dB).
Figure 6:
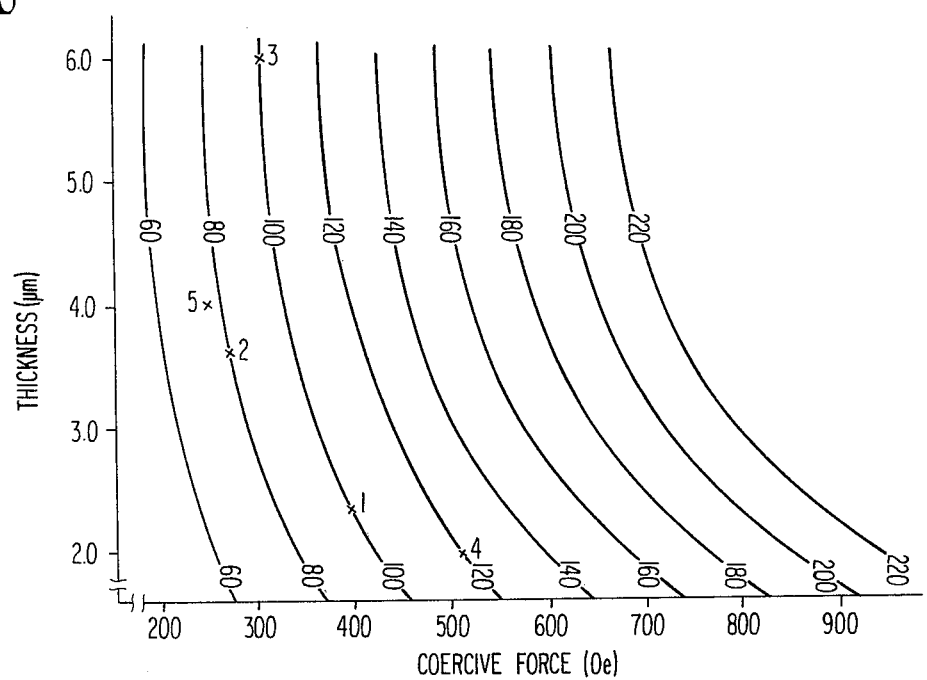
FIG. 6 is a graph showing the relationships between the operating bias value of a magnetic recording tape and the thickness of the magnetic recording layers.
Figure 7:
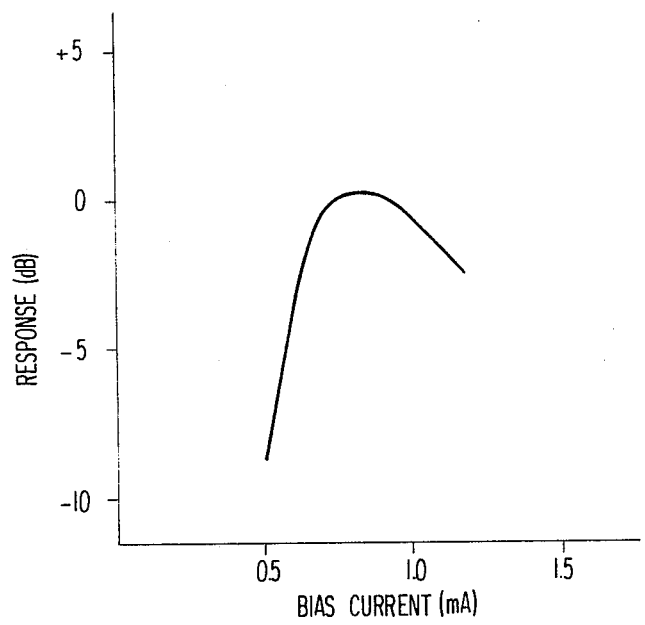
FIG. 7 is a graph showing a bias curve.

When a dual layer magnetic recording tape is prepared as a low-noise type magnetic recording tape in such manner that the outer magnetic recording layer (FIG. 6-1) has a thickness of 2.4 μm on the curve of 100% in FIG. 6 and the inner magnetic recording layer (FIG. 6-2) has a thickness of 3.6 μm on the curve of 80% in FIG. 6, a dual layer magnetic recording tape (FIG. 6-3) having an operation bias which is almost 100% is obtained. The dual layer magnetic recording tape thus prepared has the fundamental characteristics of Sample No. 3 (Table 4 and FIG. 2). Also, when a dual layer magnetic recording tape (Table 4 and FIG. 2) of Sample No. 5 is prepared experimentally in such manner that the outer magnetic recording layer has a thickness of 2.0 μm on the extension line of the 120% curve in FIG. 6 and the inner magnetic recording layer (FIG. 6-5) has a thickness of 4.0 μm on the 75% curve in FIG. 6, a dual layer magnetic recording tape of an operation bias of almost 100% is obtained (FIG. 6-3).

However, when the operation bias value of the outer magnetic recording layer is much higher than the operation bias to be used for the magnetic recording tape, the frequency characteristics extend to the high frequency range but it has been confirmed that in this case, the frequency of the characteristics at 2 KHz to 6 KHz is low (see, Sample No. 3 and No. 5 in FIG. 2), the harmonic distortion factor is high, the maximum output level is low, the S/N ratio is decreased, and the dynamic range is decreased (Table 4). Thus, a magnetic recording tape having an apparent coercive force almost the same as that of Sample No. 5 is prepared as Sample No. 7. Then, as shown in Table 5, the dual layer magnetic recording tape of Sample No. 7 thus prepared has various characteristics which are better than those of Sample No. 5 and having an excellent total balance superior to that of Sample No. 3 (see, Sample Nos. 3, 5 and 7 of FIG. 2).

Figure 3:
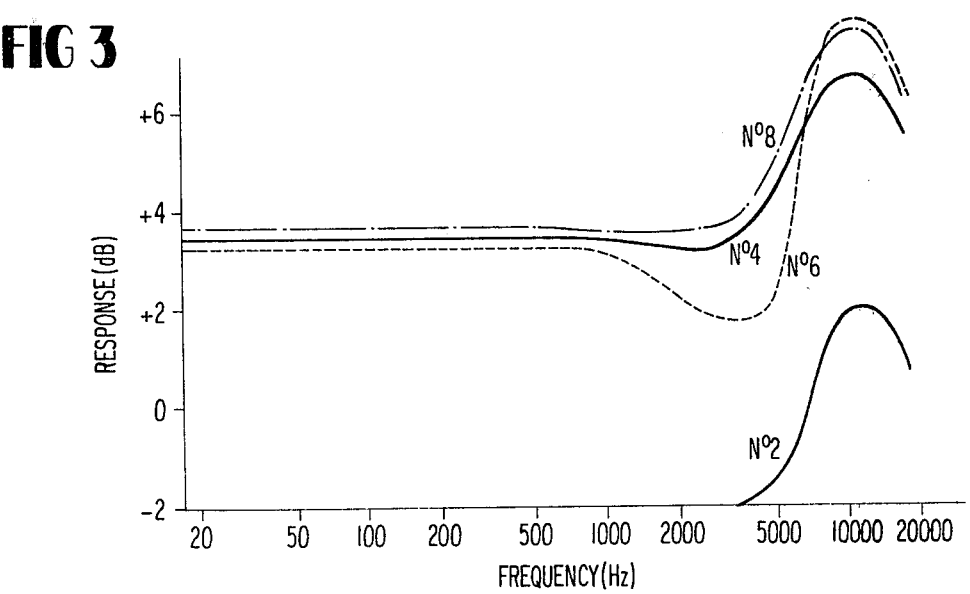
FIG. 3 is a graph showing the frequency characteristics of a $CrO_2$ type magnetic recording tape at 160% bias (the bias value of a standard tape at 100% bias is assumed to be flat at 0 dB).

When a dual layer magnetic recording tape for the $CrO_2$ position is prepared in this invention, the magnetic recording tape of Sample No. 8 having better characteristics than those of Sample No. 6 and having good balance superior to that of Sample No. 4 is obtained (see Samples Nos. 4, 6 and 8 of Table 5 and FIG. 3).

It is well known to those skilled in the art that when the surface property of a magnetic recording tape is improved and the squareness ratio of the B-H characteristics and the saturation property of the initial magnetization curve are improved, the distribution of the operation bias in FIG. 6 shifts to the left side in FIG. 6. These improvements are effective in this invention for obtaining similar effects. Accordingly, in preparing each of a low-noise type magnetic recording tape and a $CrO_2$ type magnetic recording tape, unavoidably in the distribution of the operation bias shown in FIG. 6, some change in the coercive force axis occurs. Also, it is known that the inclination of the distribution curve of the operation bias shown in FIG. 6 changes depending on the length and type of the gap of the magnetic recording head employed.

In producing the dual layer magnetic recording medium in this invention, as can be seen from FIG. 6, in order to increase the coercive force of the outer magnetic recording layer and to extend to frequency range to the high frequency side, it is preferred for the outer magnetic recording layer be comparatively thinner. It is preferred for the thickness of the outer magnetic recording layer to at least be thinner than that of the inner magnetic recording layer.

In the dual layer magnetic recording tape of this invention, it is preferred for the outer magnetic recording layer to have a thickness of from about 0.5 μm to about 3.5 μm, particularly from about 1 μm to about 3 μm, for the inner magnetic recording layer to have a thickness of from about 2.5 μm to about 15 μm, particularly from about 3 μm to about 10 μm, and for the thickness of the outer magnetic recording layer to be the same as or thinner than the thickness of the inner magnetic recording layer.

When ferromagnetic particles (1) having a coercive force (peak value) of $Hc_1$ are used for the inner magnetic recording layer and a mixture of ferromagnetic particles (2) having a coercive force (peak value) of $Hc_2$ and ferromagnetic particles (3) having a coercive force (peak value) of $Hc_3$ is used for the outer magnetic recording layer as a method of producing each of a low noise type magnetic recording tape and a $CrO_2$ type magnetic recording tape in this invention, it is particularly preferred for the values of $Hc_1$, $Hc_2$ and $Hc_3$ to be in the ranges shown in Table 2 below in relation to the thickness of the outer layer of each magnetic recording tape.

it has now been found that when the weight ratio of the ferromagnetic particles (2) to the ferromagnetic particles (3) is from 4:1 to 1:4 ($Hc_2/Hc_3$), the advantages of this invention are obtained sufficiently. Also, it is preferred for the relationship between the peak value ($Hc_1$) of the coercive force distribution of the inner layer described above and the peak values ($Hc_2$ and $Hc_3$) of the coercive force distributions of the outer layer to be $Hc_1 < Hc_2 < Hc_3$.

The ranges of these $Hc_1$, $Hc_2$ and $Hc_3$ values are $200 < Hc_1 < 470$, $315$ oe $< Hc_2 < 900$ oe, $460$ oe $< Hc_3 < 1320$ oe, and $Hc_1 < Hc_2 < Hc_3$; or $220$ oe $< Hc_1 < 520$ oe, $345$ oe $< Hc_2 < 990$ oe, $500$ oe $< Hc_2 < 1450$ oe, and $Hc_1 < Hc_2 < Hc_3$.

Particularly preferred ranges of these $Hc_1$, $Hc_2$, $Hc_3$ values and the thickness (in μm) of the outer magnetic recording layer are shown in Table 2 below.

TABLE 2

| Thickness of Outer Magnetic Recording Layer | Low Noise Type* | | | $CrO_2$ Type* | | |
|---|---|---|---|---|---|---|
| | $Hc_1$ | $Hc_2$ | $Hc_3$ | $Hc_1$ | $Hc_2$ | $Hc_3$ |
| (μm) | (oe) | (oe) | (oe) | (oe) | (oe) | (oe) |

TABLE 2-continued

| Thickness of Outer Magnetic Recording Layer | Low Noise Type* | | | $CrO_2$ Type* | | |
|---|---|---|---|---|---|---|
| | $Hc_1$ | $Hc_2$ | $Hc_3$ | $Hc_1$ | $Hc_2$ | $Hc_3$ |
| 1.0 | 200–260 | 460–560 | 670–830 | 335–415 | 740–900 | 1080–1320 |
| 1.5 | 205–265 | 405–505 | 605–745 | 340–420 | 660–800 | 970–1190 |
| 2.0 | 210–270 | 370–450 | 550–670 | 345–425 | 580–720 | 870–1070 |
| 2.5 | 220–280 | 335–415 | 500–610 | 360–440 | 540–660 | 800–980 |
| 3.0 | 240–300 | 315–385 | 460–560 | 390–470 | 500–620 | 740–900 |
| Overall Range | 200–300 | 315–560 | 460–830 | 335–470 | 500–900 | 740–1320 |

*See Table 1

In Table 2 described above, the weight ratio of the ferromagnetic particles (2) to the ferromagnetic particles (3) ($Hc_2/Hc_3$) is from 4:1 to 1:4, preferably from 3:2 to 2:3 as described above.

In the present invention, the peak value in the coercive force distribution of the outer magnetic recording layer may be at least 2 and when the peak value is higher than 2, the order of the peak values is $Hc_2$, $Hc_3$, $Hc_4$, ..., $Hc_n$ and in this case, it is preferred for the relationship thereof and the peak value ($Hc_1$) in the coercive force distribution of the inner magnetic recording layer in this case to be $Hc_1 < Hc_2 < Hc_3 < Hc_4 < Hc_5 < ... Hc_n$. In this case, the weight ratio of $Hc_2$, $Hc_3$, $Hc_4$, $Hc_5$, ..., $Hc_n$ is $(0.4/n)$ to $(1.6/n)$, preferably $(0.8/n)$ to $(1.2/n)$ for $Hc_n$. For example, when n is 3, the weight ratio is 13 to 53:13 to 53:13 to 53, preferably 26 to 40:26 to 40:26 to 40.

In addition, it is preferred for the maximum residual magnetic flux densities Br of the outer magnetic recording layer and the inner magnetic recording layer in the dual layer magnetic recording medium of this invention to be in the range of from about 1,500 Gausses to 3,500 Gausses.

The ranges shown in Table 2 described above are the ranges for application of the present invention to conventional low-noise type and $CrO_2$ type magnetic recording tapes for Philips cassettes of a width of 3.81 mm with the best effect. Furthermore, the invention can also be applied with similar effect to other type magnetic recording tapes such as, for example, magnetic recording tapes for open reel of a width of ¼ inch, EL cassettes, and mini-size cassettes (micro-cassettes) for high density recording and the invention can be applied to still other magnetic recording media with a similar effect. Therefore, it will be understood by those skilled in the art that in the production of various magnetic recording media, the numerical values shown in Table 2 can be appropriately changed without departing from the spirit and the scope of the present invention.

That is, as shown in Table 2, in producing a low-noise type dual layer magnetic recording tape, it is necessary to use ferromagnetic particles providing a peak value in the coercive force distribution at 460 to 830 oe and in the case of producing a $CrO_2$ type dual layer magnetic recording tape, it is necessary to use ferromagnetic particles providing a peak value in the coercive force distribution at 740 to 1,320 oe. Therefore, it has been discovered that the use of ferromagnetic alloy particles as the ferromagnetic particles of high coercive force for the outer magnetic recording layer is most preferred and by using such ferromagnetic alloy particles, the above-described difficulties encountered in the case of using chromium dioxide particles for the outer layer using conventional techniques have all been overcome.

Also, it is preferred to use ferromagnetic iron oxide particles as the ferromagnetic particles of comparatively low coercive force for the inner magnetic recording layer of the dual layer magnetic recording tape of this invention but it has been confirmed that, in using ferromagnetic iron oxide particles in admixture with ferromagnetic alloy particles for the inner magnetic recording layer and, further, in using a mixture thereof for the outer magnetic recording layer on an inner magnetic recording layer containing ferromagnetic iron oxide particles, they have excellent affinity, dispersibility, and physical properties and, in particular, a synergistic action of the ferromagnetic properties, which is an object of this invention, is ideally obtained.

In particular, it is preferred to use ferromagnetic alloy particles as the ferromagnetic particles of high coercive force for the outer magnetic recording layer of the dual layer magnetic recording medium of this invention. Since ferromagnetic alloy particles have a comparatively high coercive force and a high residual magnetic flux density as shown in Table 3 hereinafter, high sensitivity is obtained in using such ferromagnetic alloy particles and the use of such ferromagnetic alloy particles is suitable for the purpose of this invention.

It is preferred for ferromagnetic iron oxide particles to be used as the ferromagnetic particles of comparatively low coercive force for the inner magnetic recording layer of the dual layer magnetic recording medium of this invention. Ferromagnetic iron oxide particles have the advantages that particles having a comparatively uniform coercive force can be easily obtained in a stable condition and are inexpensive.

TABLE 3

| Chemical Composition | Description | Coercive Force (Hc) |
|---|---|---|
| | | (oersted) |
| $\gamma$-$Fe_2O_3$ | Maghemite ($\gamma$-hemite) $\gamma$-Iron Oxide | Granular 100–200 Acicular 240–450 |
| Co-$\gamma$-$Fe_2O_3$ | Cobalt Ferrite Cobalt-Doped $\gamma$-Iron Oxide | Granular 200–1000 Acicular 300–1500 |
| $Fe_3O_4$ | Magnetite | Acicular 260–450 |
| Co-$Fe_3O_4$ | Cobalt-Doped Magnetite | Acicular 320–2500 |
| Co-$FeO_x$ (x = 1.33–1.50) | Beridox* Avilyn** | Acicular 500–1500 |
| $CrO_2$ | Chromium Dioxide | Acicular 90–700 |
| Fe-Co-(Ni) | Alloy | Chain-like or 200–1800 |

TABLE 3-continued

| Chemical Composition | Description | Coercive Force (Hc) |
|---|---|---|
| | Acicular | |

*Trade name for a Co-containing Berthollide iron oxide, made by the Fuji Photo Film Co., Ltd.
**Trade name for a Co-containing Berthollide iron oxide, made by Tokyo Denki Kagaku Kogyo K.K.

The ferromagnetic iron oxides shown in Table 3 above are ferromagnetic iron oxides represented by the general formula $FeO_x$ wherein x is in the range $1.33 \leq x \leq 1.5$, that is, they are maghemite ($\gamma$-$Fe_2O_3$, x=1.50), magnetite ($Fe_3O_4$, x=1.33), and Berthollide compounds thereof ($FeO_x$, $1.33 < x < 1.50$).

x in the above formulas is shown by the following relationship;

$$x = \frac{1}{(2 \times 100)} \times (2 \times A + 3 \times B)$$

wherein
A is the atomic percent of divalent iron.
B is the atomic percent of trivalent iron.

These ferromagnetic iron oxides are particularly preferred as the materials for the inner magnetic recording layer of this invention.

These ferromagnetic iron oxides may contain a divalent metal such as Cr, Mn, Co, Ni, Cu and Zn and a suitable amount of such a divalent metal is 0 to about 10 atomic percent to the iron oxide.

The acicular ratio of the above described ferromagnetic iron oxide particles is about 2:1 to 20:1, preferably higher than 5:1, and the mean particle length is about 0.2 to 2.0 μm.

Processes of producing these ferromagnetic iron oxides are described in, for example, Japanese Patent Publication Nos. 5515/'61; 4825/'62; 5009/'64; 10,307/'64; 6538/'66; 6113/'67; 20,381/'67; 14,090/'69; 14,934/'70; 18,372/'70; 28,466/'71; 21,212/'72; 27,719/'72; 39,477/'72; 40,758/'72; 22,269/'73; 22,270/'73; 22,915/'73; 27,200/'73; 39,639/'73; 44,040/'73; and 15,757/'74; Japanese Patent Application (OPI) Nos. 22,707/'72; 8496/'74; 4199/'74; 41,299/'74 (or West German Patent Application (DT-OS) Nos. 2,221,264); 41,300/'74 (or West German Patent Application (DT-OS) Nos. 2,221,218); and 69,588/'74 (or West German Patent Application (DT-OS) No. 2,243,231); West German Patent Application (DT-OS) No. 2,022,013; and U.S. Pat. Nos. 3,075,919; 3,398,014; 3,573,980; and 3,725,126.

Examples of ferromagnetic chromium dioxides as described above are $CrO_2$ particles and $CrO_2$ particles containing 0 to about 20% by weight of a metal such as Na, K, Ti, V, Mn, Fe, Co, Ni, Te, Ru, Sn, Ce, Pb, etc., a semiconductor such as P, Sb, Te, etc., or an oxide thereof. The acicular ratio and the mean particle length thereof are substantially the same as those of the ferromagnetic iron oxide described above. However, it is not as preferred to use ferromagnetic chromium dioxides since toxicity problems can possibly occur.

The above-described ferromagnetic alloy particles have a composition comprising more than about 75% by weight of a metal, at least about 80% by weight of which metal is at least one kind of ferromagnetic metal such as Fe, Co, Ni, Fe-Co, Fe-Ni, Co-Ni, and Co-Ni-Fe, and with at least about 20% by weight, preferably 0.5 to 5% by weight, of the metal component being Al, Si, S, Se, Ti, V, Cr, Mn, Cu, Zn, Y, Mo, Rh, Pd, Ag, Sn, Sb, Te, Ba, Ta, W, Re, Au, Hg, Pb, Bi, La, Ce, Pr, Nd, B, P, etc. As the case may be, a small amount, e.g., less than 1% by weight of water and hydroxides may be present.

The above described ferromagnetic alloy particles are fine particles having a long axis of less than about 0.5 μm.

The ferromagnetic particles in the inner layer of the present invention are ferromagnetic iron oxide particles, and most of the particles are maghemite. The ferromagnetic particles in the outer layer of the present invention can be any of the above described ferromagnetic particles, and maghemite, Co-containing maghemite, Co-containing Berthollide iron oxides, $CrO_2$, Fe-Co-Ni alloy, or mixtures thereof are preferred.

The six known processes described below can be used to produce the above-described ferromagnetic alloy particles.

(1) A process comprising decomposing organic acid salts of ferromagnetic metals by heating and then reducing the products using a reductive gas as described in, for example, Japanese Patent Publication Nos. 11,412/'61; 22,230/'61; 14,809/'63; 3807/'64; 8026/'65; 8027/'65; 15,167/'65; 16,899/'65 (or U.S. Pat. No. 3,186,829); 12,096/'66; 14,818/'66 (or U.S. Pat. No. 3,190,748); 24,032/'67; 3221/'68; 22,394/'68; 29,268/'68; 4471/'69; 27,942/'69; 38,755/'71; 38,417/'72; 41,158/'72; 29,280/'73; and Japanese Patent Application (OPI) Nos. 38,523/'72 and 88,599/'75.

(2) A process comprising reducing needle-like oxyhydroxides or needle-like oxyhydroxides containing other metals, or further needle-like iron oxides obtained from these oxyhydroxides as described in, for example, Japanese Patent Publication Nos. 3862/'60; 11,520/'62; 20,335/'64; 20,939/'64; 24,833/'71; 29,706/'72; 30,477/'72 (or U.S. Pat. No. 3,598,568); 39,477/'72; 24,952/'73; and 7313/'74; Japanese Patent Application (OPI) Nos. 5057/'71 (or U.S. Pat. No. 3,634,063); 7153/'71; 79,153/'73; 82,395/'73; 97,738/'74; 24,799/'75; 51,796/'76; and 77,900/'76 and U.S. Pat. Nos. 3,607,219; 3,607,220 and 3,702,270.

(3) A process comprising evaporating a ferromagnetic metal in a low-pressure inert gas as described in, for example, Japanese Patent Publication Nos. 25,620/'71; 4131/'72; 27,718/'72; 15,320/'74; 18,160/'74; Japanese Patent Application (OPI) Nos. 25,662/'73; 25,663/'73; 25,664/'73; 25,665/'73; 31,166/'73; 55,400/'73; and 81,092/'73.

(4) A process comprising pyrolyzing a metal carbonyl compound as described in, for example, Japanese Patent Publication Nos. 1004/'64; 3415/'65; 16,868/'70; 26,799/'74; and U.S. Pat. Nos. 2,983,997; 3,172,776; 3,200,007; and 3,228,882.

(5) A process comprising electrolytically depositing ferromagnetic metal particles using a mercury cathode and then separating the deposits from the mercury as described in, for example, Japanese Patent Publication Nos. 12,910/'60; 3860/'61; 5513/'61; 787/'64; 15,525/'64; 8123/'65; 9605/'65 (or U.S. Pat. No. 3,198,717) and 19,661/'70 (or U.S. Pat. No. 3,156,650); and U.S. Pat. No. 3,262,812.

(6) A process comprising reducing a salt of a ferromagnetic metal by adding a reducing agent to a solution containing the salt as described in, for example, Japanese Patent Publication Nos. 20,520/'63; 26,555/'63; 20,116/'68; 9869/'70; 14,934/'70; 7820/'72; 16,052/'72; 41,718/'72; and 41,719/'72 (or U.S. Pat. No. 3,607,218);

Japanese Patent Application (OPI) Nos. 1353/'72 (or U.S. Pat. No. 3,756,866); 1363/'72; 42,252/'72; 42,253/'72; 44,194/'73; 79,754/'73; 82,396/'73; 43,604/'74; 99,004/'74, 41,899/'74; 18,345/'75; 19,667/'75; 41,097/'75; 41,506/'75; 41,756/'75; 72,858/'75; 72,859/'75; 79,800/'75; 104,397/'75; 106,198/'75; and U.S. Pat. Nos. 3,206,338; 3,494,760; 3,535,104; 3,567,525; 3,661,556; 3,663,318; 3,669,643; 3,672,867; 3,726,664; 3,943,012; 3,966,510; 4,007,072; 4,009,111 and 4,020,236.

Ferromagnetic alloy particles prepared by processes (3) and (6) described above are particularly effective in this invention.

The dual layer magnetic recording medium of this invention is prepared by forming an inner magnetic recording layer on a non-magnetic support by coating the inner magnetic recording layer on the support followed by drying and further forming an outer magnetic recording layer (surface magnetic recording layer) on the inner magnetic recording layer using a similar step.

Coating compositions for magnetic recording layers used in this invention are described in detail in, for example, Japanese Pat. Nos. 15/'60; 26,784/'64; 186/'68; 28,043/'72; 28,045/'72; 28,046/'72; 28,048/'72; 31,455/'72; 11,162/'73; 21,331/'73 and 33,683/'73; U.S.S.R. Pat. No. 308,033; and U.S. Pat. Nos. 2,581,414; 2,855,156; 3,240,621; 3,526,598; 3,728,262; 3,790,407; and 3,836,393.

The magnetic coating compositions described in these patterns are mainly composed of ferromagnetic fine particles, binders and solvents for coating but they contain, as the case may be, additives such as dispersing agents, lubricants, abrasives, antistatic agents, etc.

Thermoplastic resins, thermo-setting resins, reactive resins, and mixtures of these resins can be used as binders in this invention.

Suitable thermoplastic resins which can be used as binders in this invention are resins having a softening point of lower than about 150° C., a mean molecular weight of about 10,000 to 200,000, and a degree of polymerization of about 200 to 2,000. Specific examples of suitable resins are vinyl chloride-vinyl acetate copolymers, vinyl chloride-vinylidene chloride copolymers, vinyl chloride-acrylonitrile copolymers, acrylic acid ester-acrylonitrile copolymers, acrylic acid ester-vinylidene chloride copolymers, acrylic acid ester-styrene copolymers, methacrylic acid ester-acrylonitrile copolymers, methacrylic acid ester-vinylidene chloride copolymers, methacrylic acid ester-styrene copolymers, urethane elastomers, polyvinyl fluoride, vinylidene chloride-acrylonitrile copolymers, butadieneacrylonitrile copolymers, polyamide resins, polyvinyl butyral, cellulose derivatives (e.g., cellulose acetate butyrate, cellulose diacetate, cellulose triacetate, cellulose propionate, nitrocellulose, etc.), styrene-butadiene copolymers, polyester resins, various synthetic rubber type thermoplastic resins (e.g., polybutadiene, polychloroprene, polyisoprene, styrene-butadiene copolymers, etc.), and mixtures thereof.

These thermoplastic resins are described in detail in, for example, Japanese Patent Publication Nos. 6877/'62; 12,528/'64; 19,282/'64; 5349/'65; 20,907/'65; 9463/'66; 14,059/'66; 16,985/'66; 6248/'67; 11,621/'67; 4623/'68; 15,206/'68; 2889/'69; 17,947/'69; 18,232/'68; 14,020/'70; 14,500/'70; 18,573/'72; 22,063/'72; 22,064/'72; 22,068/'72; 22,069/'72; 22,070/'72; and 27,886/'73 and U.S. Pat. Nos. 3,144,352; 3,419,420; 3,499,789; and 3,713,887.

Suitable thermo-setting resins or reactive resins which can be used in this invention are those having a molecular weight of less than 200,000 as a coating liquid composition and after coating and drying, the molecular weight of the resin becomes substantially infinite due to condensation reactions, addition reactions, etc. occurring. Also, resins which are not softened or melted before the resins are decomposed are preferred. Specific examples of these resins are phenol/formaldehyde novolak resins, phenol/formaldehyde resole resins, phenol/furfural resins, xylene/formaldehyde resins, urea resins, melamine resins, drying oil-modified alkyd resins, carbolic acid resin-modified alkyd resins, maleic acid resin-modified alkyd resins, unsaturated polyester resins, a mixture of an epoxy resin and a hardening agent (e.g., a polyamine, an acid anhydride, a polyamide resin, etc.), terminal isocyanate polyester moisture-hardenable type resins, terminal isocyanate polyether moisture-hardenable type resins, polyisocyanate prepolymers (compounds having at least three isocyanate groups in one molecule obtained by reaction of a diisocyanate and a low molecular weight triol; trimers and tetramers of diisocyanates), a resin of a polyisocyanate prepolymer and an active hydrogen containing compound (e.g., a polyester polyol, a polyether polyol, an acrylic acid copolymer, a maleic acid copolymer, a 2-hydroxyethyl methacrylate copolymer, a p-hydroxystyrene copolymer, etc.), and mixtures thereof.

These resins are described in detail in, for example, Japanese Patent Publication Nos. 8103/'64; 9779/'65; 7192/'66; 8016/'66; 14,275/'66; 18.179/'67; 12,081/'63; 28,023/'69; 14,501/'70; 24,902/'70; 13,103/'71; 22,065/'72; 22,066/'72; 22,067/'72; 22,072/'72; 22,073/'72; 28,045/'72; 28,048/'72; 28,922/'72; and U.S. Pat. Nos. 3,144,353; 3,320,090; 3,437,510; 3,597,273; 3,781,210; and 3,781,211.

These binders may be used individually or as a combination thereof and further, as the case may be, additives may be added to the binder. A suitable weight ratio of the ferromagnetic particles and the binder is in the range of about 10 to 400 parts by weight, preferably 10 to 200 parts by weight, of the binder to 100 parts by weight of the ferromagnetic fine particles.

The magnetic recording layer may further contain, in addition to the above-described binders, ferromagnetic fine particles, etc., additives such as dispersing agents, lubricants, abrasives, antistatic agents, etc.

Examples of dispersing agents which can be used in this invention are fatty acids (e.g., of the formula $R_1COOR$, wherein $R_1$ is an alkyl or alkenyl group having 11 to 17 carbon atoms) having 12 to 18 carbon atoms such as caprylic acid, capric acid, lauric acid, myristic acid, palmitic acid, stearic acid, oleic acid, elaidic acid, linoleic acid, linolenic acid, and stearolic acid; metal salts, i.e., alkali metal salts (e.g., Li salts, K salts, and Na salts, etc.) or the alkaline earth metal salts (Ma salts, Ca salts, Ba salts, etc.) of these fatty acids; the fluorine-containing esters of the above-described fatty acids; amides of the above-described fatty acids; polyalkyleneoxide alkyl-phosphoric acid esters; lecithin; trialkyl polyalkyleneoxy quaternary ammonium salts (e.g., where the alkylene moiety has 1 to 5 carbon atoms, such as ethylene and propylene); and the like. Moreover, higher alcohols having 12 or more carbon atoms and the sulfuric acid esters thereof can also be used. A suitable amount of the dispersing agent is usually about 0.5 to 20 parts by weight per 100 parts by weight of the binder used.

These dispersing agents are specifically disclosed in, for example, Japanese Patent Publication Nos. 28,369/'64; 17,945/'69; 7441/'73; 15,001/'73; 15,002/'73; 16,363/'73; and 4121/'75 and U.S. Pat. Nos. 3,470,021 and 3,387,993.

Suitable lubricants which can be used in this invention include silicone oils such as dialkyl polysiloxanes (with the alkyl moiety having 1 to 3 carbon atoms), dialkoxypolysiloxanes (with the alkoxy moiety having 1 to 4 carbon atoms), monoalkylmonoalkoxypolysiloxanes (with the alkyl moiety having 1 to 5 carbon atoms and the alkoxy moiety having 1 to 4 carbon atoms), phenylpolysiloxanes, fluoroalkylpolysiloxanes (with the alkyl moiety having 1 to 5 carbon atoms), etc.; fine electrically conductive particles such as graphite particles, etc.; fine inorganic particles such as molybdenum disulfide, tungsten disulfide, etc.; fine synthetic resin particles such as polyethylene, polypropylene, ethylene-vinyl chloride copolymers, polytetrafluoroethylene, etc.; alphaolefin polymers; unsaturated aliphatic hydrocarbons which are liquid at room temperature (compounds having n-olefin double bonds at the terminal carbon atoms, having about 18 to about 24 carbon atoms); and fatty acid esters comprising monocarboxylic fatty acids having 12 to 20 carbon atoms and monohydric alcohols having 3 to 12 carbon atoms. A suitable amount of these lubricants is usually about 0.2 to 20 parts by weight per 100 parts by weight of the binder.

These lubricants are disclosed in, for example, Japanese Patent Publication Nos. 23,889/'68; 40,461/'71; 15,621/'72; 18,482/'72; 28,043/'72; 30,207/'72; 32,001/'72; 7442/'73; 14,247/'74; and 5042/'75; U.S. Pat. Nos. 3,470,021; 3,492,235; 3,497,411; 3,523,086; 3,625,760; 3,630,772; 3,634,253; 3,642,539; and 3,687,725; *IBM Technical Disclosure Bulletin;* Vol. 9, No. 7, 779 (December 1966); and *Elektronik;* No. 12, 380 (1961).

Materials generally used as abrasives, such as fused alumina, silicon carbide, chromium oxide, corumdum, artificial corundum, diamond, artificial diamond, garnet, emery (main components: corundum and magnetite), etc., can be used as abrasives in this invention. These abrasives used in this invention have a MoHs' hardness of higher than about 5, and a mean particle size of about 0.05 to 5 microns, in particular 0.1 to 2 microns. These abrasives are usually employed in an amount of about 0.5 to 20 parts by weight per 100 parts by weight of the binder used.

These abrasives are described in, for example, Japanese Patent Publication Nos. 18,572/'72; 15,003/'73; 15,004/'73 (or U.S. Pat. No. 3,617,378); 39,402/'74; and 9401/'75; U.S. Pat. Nos. 3,007,807; 3,041,196; 3,293,066; 3,630,910; 3,687,725; British Pat. No. 1,145,349; West German Patent (DT-PS) Nos. 853,211 and 1,101,000.

Suitable antistatic agents which can be used in this invention are fine electrically conductive particles such as carbon black, carbon black graft polymers, etc.; natural surface active agents such as saponin, etc.; nonionic surface active agents such as alkylene oxide type surfactants, glycerin type surfactants, glycidol type surfactants, etc.; cationic surface active agents such as higher alkylamines, quaternary ammonium salts, pyridine and other heterocyclic ring compounds, phosphoniums, sulfoniums, etc.; anionic surface active agents containing an acid group such as a carboxylic acid group, a sulfonic acid group, a phosphoric acid group, a sulfuric acid ester group, a phosphoric acid ester group, etc.; and amphoteric surface active agents such as aminoacids, aminosulfonic acids, sulfuric acid esters or phosphoric acid esters of aminoalcohols, etc.

Examples of surface active agents which can be used as antistatic agents in this invention are disclosed in, for example, Japanese Patent Publication Nos. 22,726/'71; 24,881/'72; 26,882/'72; 15,440/'73 and 26,761/'73; U.S. Pat. Nos. 2,271,623; 2,240,472; 2,288,226; 2,676,122; 2,676,924; 2,676,975; 2,691,566; 2,727,860; 2,730,498; 2,742,379; 2,739,891; 3,068,101; 23,158,484; 3,201,253; 3,210,191; 3,294,540; 3,415,649; 3,441,413; 3,442,654; 3,475,174; and 3,545,974; West German Patent Application (OLS) 1,942,665; and British Patent Nos. 1,077,317 and 1,198,450.

Furthermore, examples of suitable surface active agents are described in Ryohei Oda, et al; *Synthesis of Surface Active Agents and Applications Thereof,* Maki Shoten (1964); A. M. Schwartz & J. W. Perry, *Surface Active Agents, Interscience Publications Incorporated* (1958); J. P. Sisley, *Encyclopedia of Surface Active Agents;* Vol. 2, Chemical Publishing Company (1964); and *Kaimen Kasseizai Binran (Handbook of Surface Agents),* 6th Edition, Sangyo Tosho K. K. (Dec. 20, 1966).

These surface active agents may be used individually or as a mixture thereof and they can be used for other purposes such as for improving the dispersion and magnetic characteristics, improving the lubricating properties, and as a coating aid.

The magnetic recording layers of this invention are formed by dispersing each of the components for the outer magnetic recording layer and the inner magnetic recording layer followed by kneading to provide a liquid coating composition for each, coating the coating composition for the inner magnetic recording layer on a non-magnetic support followed by drying, and then coating the coating composition for the outer magnetic recording layer on the inner layer followed by drying. During the period between the coating of each of the coating compositions for the inner magnetic recording layer and the outer magnetic recording layer and the drying thereof, a treatment for orienting the ferromagnetic particles in the magnetic recording layers can be employed and further, after drying, a surface smoothening treatment may be applied to these magnetic recording layers.

Suitable materials for the non-magnetic supports used in this invention include polyesters such as polyethylene terephthalate, polyethylene-2,6-naphthalate, etc.; polyolefins such as polypropylene, etc.; cellulose derivatives such as cellulose triacetate, cellulose diacetate, etc.; synthetic resins such as polycarbonates, etc.; and metals such as aluminum alloys, copper alloys, etc.

The support used in this invention may be in any form such as films, tapes, sheets, etc. and the materials for the support may be selected depending on the form employed.

A suitable thickness of these non-magnetic supports is about 2 to 50 $\mu$m, preferably 3 to 25 $\mu$m in the case of films, tapes, and sheets and depending on the type of recorder used.

When the above-described support is used as the form of a film, a tape, a sheet, a thin flexible disc, etc., the opposite side of the support to the side having the magnetic recording layer thereon may be coated with a so-called back coat for the purpose of prevention of the generation of static charges, print through prevention, prevention of the occurence of wow and flutter, etc.

Examples of back coat layers which can be employed in this invention are described in, for example, U.S. Pat. Nos. 2,804,401; 3,293,066; 3,617,378; 3,062,676; 3,734,772; 3,476,596; 2,643,048; 2,803,556; 2,887,462; 2,923,642; 2,997,451; 3,007,892; 3,041,196; 3,115,420; 3,166,688 and 2,761,311.

Thus, the magnetic coating compositions in this invention are prepared by kneading the ferromagnetic particles together with the above-described binders, dispersing agents, lubricating agents, abrasives, antistatic agents, solvents, etc.

The ferromagnetic particles and the above-described components can be placed in a kneading machine simultaneously or successively, for kneading. For example, a magnetic coating composition can be prepared by adding ferromagnetic particles to a solvent containing a dispersing agent and kneading the mixture for a definite period of time.

Various kinds of kneading machines can be used for kneading and dispersing the magnetic coating composition. For example, a two-roll mill, a three-roll mill, a ball mill, a pebble mill, a sand grinder, a Szegvari attritor, a high speed impeller, a high speed stone mill, a high speed impact mill, a homogenizer, a ultrasonic dispersing machine, etc.

Suitable techniques for kneading and dispersing which can be employed in this invention are described in T. C. Patton; *Paint Flow and Pigment Dispersion*, John Wiley & Sons Co. (1964) as well as in U.S. Pat. Nos. 2,581,414 and 2,855,156.

Air doctor coating, blade coating, air knife coating, squeeze coating, dip coating, reverse roll coating, transfer roll coating, gravure coating, cast coating, kiss coating, spray coating, etc., can be employed and further other coating methods may also be employed to coat the above-described magnetic recording layers on the support. Descriptions of these coating methods are described in detail in *Coating Kogaku (Coating Engineering)*, pages 253–277, Asakura Shoten (Mar. 20, 1971).

The dual layer magnetic recording medium of this invention is prepared by forming two magnetic recording layers on a non-magnetic support by repeating the steps of coating the magnetic recording layer on the support using the above-described coating methods and drying. Furthermore, the two magnetic recording layers may be formed simultaneously using a simultaneous multi-layer coating as described in, for example, Japanese Patent Application (OPI) Nos. 98,803/'73 (or West German Patent (DT-OS) No. 2,309,159) and 99,233/'73 (or West German Patent (DT-AS) No. 2,309,158).

Suitable organic solvents which can be used for coating the outer magnetic recording layer and the inner magnetic recording layer are ketones such as acetone, methyl ethyl ketone, methyl isobutyl ketone, cyclohexanone, etc.; alcohols such as methanol, ethanol, propanol, butanol, etc.; esters such as methyl acetate, ethyl acetate, butyl acetate, ethyl lactate, glycol acetate monoethyl ether, etc.; ethers and glycol ethers such as diethyl ether, glycol dimethyl ether, glycol monoethyl ether, dioxane, etc.; aromatic hydrocarbons such as benzene, toluene, xylene, etc.; and chlorinated hydrocarbons such as methylene chloride, ethylene chloride, carbon tetrachloride, chloroform, ethylenechlorohydrin, dichlorobenzene, etc.

The magnetic recording layer formed on the support using the above-described method is, if desired, subjected to a treatment to orient the ferromagnetic particles as mentioned above, and then dried. Also, if desired, the magnetic recording layer is subjected to a surface smoothening treatment and further, the magnetic recording medium thus formed is cut into the desired shape to provide the magnetic recording medium of this invention. In particular, it has further been found that by applying a surface smoothening treatment to the surface of the magnetic recording layer of this invention, a magnetic recording medium having a smooth surface and excellent abrasion resistance can be obtained.

In particular, it is preferred for the surface of the inner magnetic recording layer to be subjected to a surface smoothening treatment to provide a surface having a roughness of less than 0.2 S, an outer magnetic recording layer is coated on the inner layer, and then, after drying, the surface of the outer magnetic recording layer is subjected to a surface smoothening treatment to provide a surface having a roughness of less than 0.2 S.

When an orientation treatment is employed, the magnetic field for the orientation can be an alternating current magnetic field or a direct current magnetic field of about 500 to 2,000 Gauss.

A suitable drying temperature for the magnetic recording layers is about 50° to 100° C., preferably 70° to 100° C., more preferably 80° to 90° C.; a suitable flow amount of air is about 1 to 5 kiloliters/m$^2$, preferably 2 to 3 kiloliters/m$^2$; and a suitable drying period of time is about 30 seconds to 10 minutes, preferably 1 to 5 minutes.

The orientation direction of the ferromagnetic particles is determined depending on the use of the magnetic recording medium. That is, in the case of an audio tape, a small-sized video tape, a memory tape, etc., the direction of the orientation is parallel to the lengthwise direction of the tape, while in the case of a broadcasting video tape, the magnetic recording tape is oriented at an angle of 30° to 90° to the lengthwise direction of the tape.

Orientation methods for ferromagnetic particles are described in, for example, U.S. Pat. Nos. 1,949,840; 2,796,359; 3,001,891; 3,172,776; 3,416,949; 3,473,960; and 3,681,138; and Japanese Patent Publication Nos. 3427/'57; 28,368/'64; 23,624/'65; 23,625/'65; 13,181/'66; 13,043/'73 and 39,722/'73.

Furthermore, as described in West German Patent (DT-AS) No. 1,190,985, the direction of orientation may differ between the outer magnetic recording layer and the inner magnetic recording layer.

The above-described surface smoothening treatment for each magnetic recording layer can be performed by calendering after drying or using a smoothening sheet before drying.

In calendering, it is preferred for the smoothening to be performed using a super calender method, wherein the magnetic recording tape is passed through two rolls, e.g., a metal roll and a cotton roll or a synthetic resin (e.g., nylon) roll. Super calender smoothening is preferably performed under the conditions of an inter roll pressure of about 25 to 50 kg/cm$^2$, a temperature of about 35° to 150° C., and a speed of 5 to 120 meters/min. If the temperature and the pressure are above the above-described upper limits, the magnetic recording layers and the non-magnetic supports are adversely affected. Also, if the treatment speed is lower than about 5 meters/min., no surface smoothening effect is obtained and if the speed is higher than about 120 meters/m$^2$, no benefits due to the operation are observed.

These surface smoothening treatments are described in, for example, U.S. Pat. Nos. 2,688,567; 2,998,325; and 3,783,023; West German Patent Application (OLS) No. 2,405,222; and Japanese Patent Application (OPI) Nos. 53,631/'74 and 10,337/'75.

The invention is explained more specifically by reference to the following comparison examples and examples. It is, however, to be understood that the compositions, component ratios, the order of operations, etc., shown therein can be changed or modified within the scope of this invention. Therefore, the invention is not to be construed as being limited to the examples shown below. Further, all parts, percents, ratios and the like are by weight unless otherwise indicated.

| Comparison Example 1 (Single layer magnetic recording tape) | parts |
|---|---|
| Fine Ferromagnetic Particles (as shown in Table 4) | 100 |
| Vinyl Chloride Resin (vinyl chloride/vinylidene chloride ratio: 87 : 13 mol %; polymerization degree : 400) | 20 |
| Acrylic Acid Ester/Acrylonitrile Copolymer (6 : 4 mol ratio) | 15 |
| Dibutyl Phthalate | 2 |
| Lecithin | 1.5 |
| Carbon Black (mean particle size: 40 μm) | 0.5 |
| Butyl Acetate | 250 |

The above-described composition was mixed well to form a magnetic coating composition, coated on a polyethylene phthalate support of a thickness of 12 μm at a specific dry thickness, and after drying, the surface was subjected to a surface smoothening treatment. The single layer magnetic recording tape thus obtained was cut in a width of about 3.81 mm and then mounted in a Philips-type tape cassette. Thus, Sample No. 1 and Sample No. 2 were prepared. The fine ferromagnetic particles used and the properties thereof are shown in Table 4 below.

| Comparison Example 2 | parts |
|---|---|
| Fine Ferromagnetic Particles (as shown in Table 4) | 100 |
| Vinyl Chloride Resin (vinyl chloride/vinylidene chloride ratio: 87 : 13 mol%; polymerization degree: 400) | 20 |

| -continued Comparison Example 2 | parts |
|---|---|
| Polyester Polyurethane (molecular weight: about 30,000: reaction product of diphenylmethane diisocyanate and a polyester consisting of adipic acid with diethylene glycol and butanediol) | 10 |
| Triisocyanate Compound (75% ethyl acetate solution of the reaction product of 3 moles of toluene diisocyanate and 1 mole of trimethylolpropane, trade name, Desmodur L-75, made by Bayer A. C.) | 5 |
| Dibutyl Phthalate | 2 |
| Lecithin | 2 |
| Butyl Acetate | 250 |

The above-described composition was mixed well to provide a magnetic coating composition for an inner magnetic recording layer coated on a polyethylene terephthalate support of a thickness of 12 μm at a specific dry thickness, and after drying, the surface of the inner magnetic recording layer formed was subjected to a surface smoothening treatment.

| | parts |
|---|---|
| Fine Ferromagnetic Particles (as shown in Table 4) | 100 |
| Vinyl Chloride Resin (vinyl chloride/vinylidene chloride ratio: 87 : 13 mol%; polymerization degree: 400) | 20 |
| Acrylic Acid Ester-Acrylonitrile Copolymer (6 : 4 mol ratio) | 15 |
| Dibutyl Phthalate | 2 |
| Lecithin | 1.5 |
| Carbon Black (mean particle size 40: μm) | 0.5 |
| Butyl Acetate | 250 |

The above-described composition was mixed well to form a magnetic coating composition, coated on the above-described inner magnetic recording layer at a specific dry thickness, and after drying, the surface of the outer magnetic recording layer was subjected to a surface smoothening treatment. The dual layer magnetic recording medium thus prepared was cut into a width of about 3.81 mm and mounted in a Philips-type tape cassette. Thus, Samples No. 3, No. 4, No. 5 and No. 6 were prepared. The fine ferromagnetic particles used and the properties thereof are shown in Table 4 below.

TABLE 4

| Sample No. | Magnetic Layer | Thickness (μm) | Fine Ferromagnetic Particles Type | Hc (oe) | Maximum Residual Magnetic Flux Density Br (Gauss) | Operation bias[6] (%) | Sensitivity[7] (dB) | Frequency Characteristics[8] (dB) | MOL[9] (dB) | S/N Ratio[10] (dB) | Dynamic Range[11] (dB) | Harmonic Distortion Factor[12] (%) |
|---|---|---|---|---|---|---|---|---|---|---|---|---|
| No. 1 | Single Layer | 5.0 | $\gamma\text{-Fe}_2\text{O}_3$ | 310 | 1,600 | 102 | ±0.0 | +1.5 | +2.5 | 51.5 | 72.0 | 1.40 |
| No. 2 | Single Layer | 6.0 | $\text{CrO}_2$ | 480 | 1,900 | 160 | −2.0 | +3.2 | +1.5 | 57.5 | 71.5 | 1.35 |
| No. 3 | Outer Layer | 2.4 | $\gamma\text{-Fe}_2\text{O}_3$ | 390 | 1,400 | 105 | +4.0 | +2.0 | +6.5 | 54.0 | 76.5 | 1.35 |
| | Inner Layer | 3.6 | $\gamma\text{-Fe}_2\text{O}_3$ | 270 | 1,800 | | | | | | | |
| No. 4 | Outer Layer | 2.4 | $\text{Co-FeO}_x$ | 625 | 1,400 | 161 | +3.5 | +3.0 | +7.5 | 61.0 | 77.5 | 1.35 |
| | Inner Layer | 3.6 | $\gamma\text{-Fe}_2\text{O}_3$ | 430 | 1,800 | | | | | | | |
| | Outer | 2.0 | $\text{CrO}_2$ | 510 | 1,900 | | | | | | | |

TABLE 4-continued

| Sample No. | Magnetic Layer | Thickness (μm) | Fine Ferro-magnetic Particles Type | Hc (oe) | Maximum Residual Magnetic Flux Density Br (Gauss) | Operation bias[6] (%) | Sensitivity[7] (dB) | Frequency Characteristics[8] (dB) | MOL[9] (dB) | S/N Ratio[10] (dB) | Dynamic Range[11] (dB) | Harmonic Distortion Factor[12] (%) |
|---|---|---|---|---|---|---|---|---|---|---|---|---|
| No. 5 | Layer Inner Layer | 4.0 | γ-Fe₂O₃ | 240 | 1,800 | 106 | +4.1 | +3.5 | +3.9 | 53.2 | 74.0 | 2.3 |
| No. 6 | Outer Layer | 2.0 | Fe-Co-Ni alloy | 810 | 3,000 | 170 | +3.3 | +4.3 | +4.7 | 58.8 | 74.6 | 2.2 |
|  | Inner Layer | 4.0 | γ-Fe₂O₃ | 385 | 1,800 | | | | | | | |

The values of the electromagnetic transformation characteristics shown in Table 4 described above the Table 5 shown hereinafter are based on Standard MTS-102 of the Society of Magnetic Tape Industry.

(1) (Standard tape): QP-12 tape made by BASF A.G. is defined as the standard tape.

(2) (Tape record for test): The tape record for testing is QP-12 tape recorded at output level when the residual magnetic flux of the tape surface of a 333 Hz signal is 250 pwb per mm.

(3) (Normal bias current): The normal bias current is a bias current giving an output of 0.5 dB lower than the maximum output of a 4 KHz signal by the standard tape.

(4) (Normal output level): The normal output level is the output level for testing when the first division (level controlling signal of 333 Hz) of the test tape record is reproduced by the cassette recorder for testing, and is also the output level when the residual magnetic flux of the tape surface of a 333 Hz signal is 250 pwb per mm.

(5) (Normal input level): The normal input level is the input level of a test cassette recorder which gives the normal output level when a 333 Hz signal is recorded on the standard tape using the normal bias current.

(6) (Operation bias): A 4 KHz signal is recorded on a sample tape at a constant level corresponding to a level lower than the normal input level while increasing the bias current, the bias current when the reproduction output gives an output of 0.5 dB lower than the maximum output is measured, and the difference from the normal bias current is expressed as a percentage.

(7) (Sensitivity): A 333 Hz signal is recorded on a test magnetic recording tape at the normal bias current and at an input of 20 dB lower than the normal input level, the reproduction output level is measured, and the difference from the level at 20 dB lower than the normal output level is expressed in dB as the sensitivity.

(8) (Frequency characteristics): 333 Hz and 8 KHz signals are recorded on a test magnetic recording tape at the normal bias current and at an input of 20 dB lower than the normal input level, the recorded signals are reproduced and the reproduction output level of each signal is measured, and the relative ratio a of the reproduction level of the 8 KHz signal to the reproducing level of the 333 Hz signal is determined. Then, the same measurement is made for the standard tape and the relative value $a_o$ of the reproduction level of the 8 KHz signal to the reproduction level of the 333 Hz signal is determined. Then, the difference d to the standard value is obtained by the following relationship and is expressed in dB:

$$d = a - a_o$$

(9) (Maximum non-distorted output (MOL): Recording and reproducing are preformed at the normal bias current while increasing the input level of the 333 Hz signal and the output level at which the third harmonic wave component included in the reproduced output level becomes 5% is determined. The difference between the output level and the normal output level is expressed in dB.

(10) (S/N ratio): A 1 KHz signal is recorded on a test magnetic recording tape at the normal bias and at the normal input level, after continuing the recording while cutting the 1 KHz signal, the recorded signal is reproduced, the reproduced output level of the 1 KHz signal and the noise output level on non-signal recording are measured, and the difference between them is expressed in dB. The reproduction was measured through the audio correction circuit of JIS C 5542-1971 (magnetic recording tape test method).

Also, the dynamic range (D.R.) and the harmonic distortion factor were measured as follows:

(11) (Dynamic range): The difference between the MOL of the test tape and the level of the bias noise at 333 Hz is expressed in dB.

(12) (Harmonic distortion factor): A 333 Hz signal is recorded on a test tape at the normal bias current and the normal input level, the signal is reproduced, and the harmonic distortion factor of the third harmonic wave included in the reproduced signal is measured and expressed as a percent.

In addition, for the samples of $CrO_2$ type tapes (Samples No. 2, No. 4, No. 6, No. 8, No. 10, and No. 12), the sensitivity, frequency characteristics, MOL, S/N ratio, dynamic range, and harmonic distortion factor were evaluated at a bias current of 160%.

EXAMPLE 1

A composition the same as in that described for forming the inner layer in Comparison Example 2 above, except that the fine ferro-magnetic particles were replaced by the fine ferromagnetic particles shown in Table 5 below, was mixed well to provide a magnetic coating composition for an inner magnetic recording layer, the coating composition was coated on a polyethylene terephthalate support of a thickness of 12 μm at a specific dry thickness followed by drying, and the surface of the layer was subjected to a surface smoothening treatment. Thereafter, the fine ferro-magnetic particles for the outer magnetic recording layer as shown in Table 5 below were mixed at a mixing ratio (weight ratio) as shown in Table 5 below and a composition the same as that for the outer magnetic recording layer described in Comparison Example 2, using the mixture of the fine ferro-magnetic particles in place of the ferromagnetic particles in Comparison Example 2, was mixed well to provide a magnetic coating composition for the outer magnetic recording layer, the coating composition was coated on the above-described inner magnetic recording layer at a specific dry thickness followed by drying, and the surface of the layer was subjected to a surface smoothening treatment. The dual layer magnetic recording medium thus obtained was cut into a width of about 3.81 mm and was mounted in a Philips-type tape cassette. Thus, Samples No. 7 to No. 11 were prepared using two kinds of fine ferro-magnetic particles for the coating composition for the outer magnetic recording layer and Sample No. 14 was prepared using three kinds of fine ferromagnetic particles. The ferromagnetic particles used and the properties thereof are shown in Table 5 below.

(i) The sensitivity is high
(ii) The frequency characteristics are high;
(iii) There is no low sensitivity over the whole frequency range and flat frequency characteristics are obtained with a standard equalization;
(iv) The harmonic distortion is low and the MOL is very high;
(v) The S/N ratio is good; Furthermore,
(vi) Even though the magnetic recording medium of this invention has two magnetic recording layers, the magnetic recording medium provides the best quality of the tape using the conventional low noise position and the conventional $CrO_2$ position without the need for a new tape select position.

TABLE 5

| Sample No. | Magnetic Layer | Thickness (μm) | Fine Ferromagnetic Particles Peak | Type | Hc (oe) | Mixing Ratio (wt %) | Maximum Residual Magnetic Flux Density Br (Gauss) | Operation bias[6] (%) | Sensitivity[7] (dB) | Frequency Characteristics[8] (dB) | MOL[9] (dB) | S/N Ratio[10] (dB) | Dynamic Range[11] (dB) | Harmonic Distortion Factor[12] (%) |
|---|---|---|---|---|---|---|---|---|---|---|---|---|---|---|
| No. 7 | Outer Layer | 2.0 | $Hc_3$ | Fe-Co-Ni alloy | 610 | 50 | 2,200 | 102 | +4.2 | +3.3 | +8.0 | 54.4 | 77.8 | 1.30 |
|  |  |  | $Hc_2$ | $\gamma$-$Fe_2O_3$ | 410 | 50 |  |  |  |  |  |  |  |  |
|  | Inner Layer | 4.0 | $Hc_1$ | $\gamma$-$Fe_2O_3$ | 240 | — | 1,800 |  |  |  |  |  |  |  |
| No. 8 | Outer Layer | 2.0 | $Hc_3$ | Fe-Co-Ni alloy | 970 | 50 | 2,200 | 161 | +3.7 | +3.9 | +8.5 | 61.0 | 78.0 | 1.30 |
|  |  |  | $Hc_2$ | Co-$FeO_x$ | 650 | 50 |  |  |  |  |  |  |  |  |
|  | Inner Layer | 4.0 | $Hc_1$ | $\gamma$-$Fe_2O_3$ | 385 | — | 1,800 |  |  |  |  |  |  |  |
| No. 9 | Outer Layer | 1.0 | $Hc_3$ | Fe-Co-Ni alloy | 720 | 70 | 2,200 | 105 | +4.0 | +3.6 | +7.7 | 54.2 | 77.6 | 1.35 |
|  |  |  | $Hc_2$ | Co-$FeO_2$ | 520 | 30 |  |  |  |  |  |  |  |  |
|  | Inner Layer | 5.0 | $Hc_1$ | $\gamma$-$Fe_2O_3$ | 230 | — | 1,800 |  |  |  |  |  |  |  |
| No. 10 | Outer Layer | 1.0 | $Hc_3$ | Fe-Co-Ni alloy | 1,100 | 70 | 3,000 | 163 | +3.6 | +4.3 | +9.0 | 61.1 | 77.7 | 1.35 |
|  |  |  | $Hc_2$ | Fe-Co-Ni alloy | 840 | 30 |  |  |  |  |  |  |  |  |
|  | Inner Layer | 5.0 | $Hc_1$ | $\gamma$-$Fe_2O_3$ | 375 | — | 1,800 |  |  |  |  |  |  |  |
| No. 11 | Outer Layer | 3.0 | $Hc_3$ | Fe-Co-Ni alloy | 830 | 20 | 2,200 | 161 | +3.6 | +3.7 | +8.3 | 60.8 | 77.8 | 1.30 |
|  |  |  | $Hc_2$ | Co-$FeO_x$ | 580 | 80 |  |  |  |  |  |  |  |  |
|  | Inner Layer | 3.0 | $Hc_1$ | $\gamma$-$Fe_2O_3$ | 430 | — | 1,800 |  |  |  |  |  |  |  |
| No. 12 | Outer Layer | 1.5 | $Hc_4$ | Fe-Co-Ni alloy | 675 | 35 | 1,700 | 106 | +4.1 | +3.5 | +8.2 | 54.4 | 78.0 | 1.30 |
|  |  |  | $Hc_3$ | Co-$FeO_x$ | 500 | 35 |  |  |  |  |  |  |  |  |
|  |  |  | $HC_2$ | $\gamma$-$Fe_2O_3$ | 435 | 30 |  |  |  |  |  |  |  |  |
|  | Inner Layer | 4.5 | $Hc_1$ | $\gamma$-$Fe_2O_3$ | 235 | — | 1,800 |  |  |  |  |  |  |  |

The characteristics in Table 5 were measured in the same manner as those in Table 4.

From the data shown in Table 4 and Table 5, the excellent effects and advantages of this invention can be seen from a comparison of the characteristics of the low-noise type comparison magnetic recording tapes (Sample Nos. 1, 3 and 5) with the characteristics of the low-noise type magnetic recording tapes of this invention (Sample Nos. 7, 9 and 12) and from a comparison of the characteristics of $CrO_2$ type comparison magnetic recording tapes (Samples Nos. 2, 4 and 6) with the characteristics of the $CrO_2$ type magnetic recording tapes of this invention (Sample Nos. 8, 10 and 11).

As described above, the multilayer magnetic recording media of this invention possess excellent advantages. Some of them are summarized below.

While the invention has been described in detail and with reference to specific emnbodiment thereof, it will be apparent to one skilled in the art that various changes and modifications can be made therein without departing from the spirit and scope thereof.

What is claimed is:

1. A multilayer magnetic recording medium comprising a non-magnetic support having thereon two magnetic recording layers, each comprising fine ferromagnetic particles dispersed in a binder, said fine ferromagnetic particles of the uppermost magnetic recording layer being a mixture of 2 or more kinds of fine ferromagnetic particles having two or more peaks in the coercive force distribution and said ferromagnetic alloy particles, wherein when the peak values in the coercive force distribution of the fine ferromagnetic particles in the outermost magnetic recording layer are $Hc_2$, $Hc_3$, $Hc_4$, ... $Hc_n$, the mixing ratio by weight of the fine ferromagnetic particles is (0.4/n) to (1.6/n), said fine ferromagnetic particles of the innermost magnetic recording layer being fine ferromagnetic iron oxide particles having peaks in the coercive force distribution lower than the minimum value of the peaks of the ferromagnetic particles of the outermost magnetic recording layer, and wherein the peak values in the coercive force distribution of the fine ferromagnetic particles in the outermost magnetic recording layer are $Hc_2$, $Hc_3$, ... $Hc_n$ and when the peak value is $Hc_1$ in the coercive force distribution of the fine ferromagnetic particles in the innermost magnetic recording layer, these peak values are in the relationship $$Hc_1 < Hc_2 < Hc_3 < \ldots < Hc_n,$$

the thickness of the outermost magnetic recording layer being not greater than the thickness of the inner magnetic recording layer.

2. The multilayer magnetic recording medium of claim 1, wherein the peak value $Hc_1$ in the coercive force distribution of the fine ferromagnetic particles in the innermost magnetic recording layer is 200 oe $< Hc_1 <$ 470 oe and the peak values $Hc_2$ and $Hc_3$ in the coercive force distribution of the fine ferromagnetic particles in the outermost magnetic recording layer are 315 oe $< Hc_2 <$ 900 oe and 460 oe $< Hc_2 <$ 1,320 oe, respectively.

3. The multilayer magnetic recording medium of claim 1, wherein the peak value $Hc_1$ in the coercive force distribution of the fine ferromagnetic particles in the innermost magnetic recording layer is 220 oe $< Hc_1 <$ 520 oe and the peak values $Hc_2$ and $Hc_3$ in the coercive force distribution of the fine ferromagnetic particles in the outermost magnetic recording layer are 345 oe $< Hc_2 <$ 990 oe and 500 oe $< Hc_3 <$ 1,450 oe, respectively.

4. The multilayer magnetic recording medium of claim 1, wherein the weight ratio of the fine ferromagnetic particles having the peak value of $Hc_2$ and the fine ferromagnetic particles having the peak value of $Hc_3$ for the outermost magnetic recording layer is about 4:1 to about 1:4.

5. The multilayer magnetic recording medium of claim 1, wherein the thickness of the outermost magnetic recording layer is about 0.5 to 3.5 μm, the thickness of the innermost magnetic recording layer is about 2.5 to 15 μm and the thickness of the outermost magnetic recording layer is not greater than the thickness of the innermost magnetic recording layer.

6. The multilayer magnetic recording medium of claim 5, wherein the fine ferromagnetic particles in the outermost recording layer are Fe-Co-Ni alloy and $\gamma$-$Fe_2)_3$ and the fine ferromagnetic iron oxide particles in the innermost magnetic recording layer are $\gamma$-$Fe_2O_3$.

7. The multilaryer magnetic recording medium of claim 5, wherein the fine ferromagnetic particles in the outermost magnetic recording layer are Fe-Co-Ni alloy and Co-FeOx and the fine ferromagnetic iron oxide particles in the innermost magnetic recording layer are $\gamma$-$Fe_2O_3$.

8. The multilayer magnetic recording medium of claim 1, wherein the surface of the innermost magnetic recording layer has a mean surface roughness of less than about 0.2 S due to a surface smoothening treatment and the surface of the outermost magnetic recording layer has a mean surface roughness of less than about 0.2 S due to a surface smoothening treatment.

9. The multilayer magnetic recording medium of claim 1, which is an audio recording medium and which illustrates good linearity over a broad frequency range and a broad dynamic range.

10. The multilayer magnetic recording medium of claim 1, wherein the peak value $Hc_1$ is 200 Oe $< Hc_1 <$ 300 Oe and the peak values of $Hc_2$ and $Hc_3$ are 315 Oe $< Hc_2 <$ 560 Oe and 460 Oe $< Hc_3 <$ 830 Oe, respectively.

11. The multilayer magnetic medium of claim 1, wherein the peak value of $Hc_1$ is 335 Oe $< Hc_1 <$ 470 Oe and the peak values $Hc_2$ and $Hc_3$ are 500 Oe $< Hc_2 <$ 900 Oe and 740 Oe $< Hc_3 <$ 1320 Oe, respectively.

12. The multilayer magnetic recording medium of claim 1, wherein said outermost magnetic recording layer has a residual magnetic flux density Br of at least 1,700 Gauss.

* * * * *